July 9, 1963  C. B. MERRY  3,096,997
SPRING FRAME FOR SCOOTER-TYPE TRAIL VEHICLE
Filed March 3, 1961  3 Sheets-Sheet 1
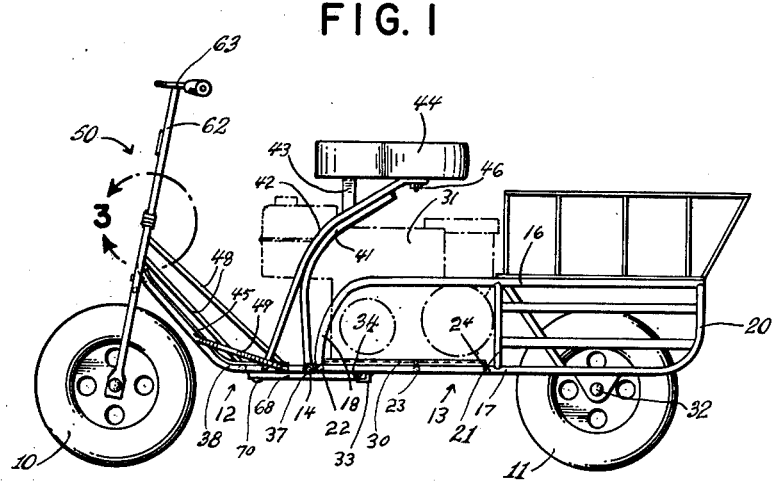
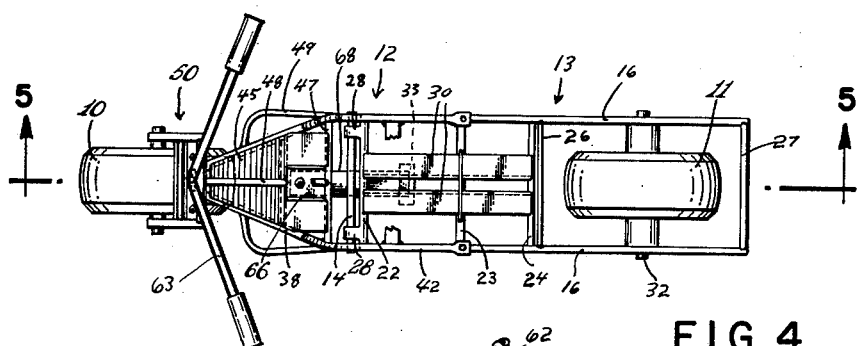
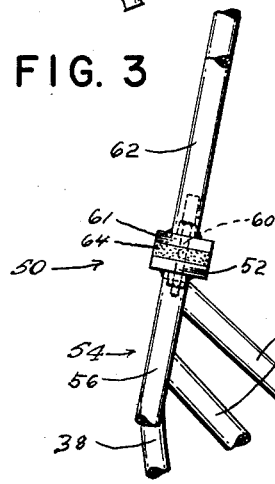
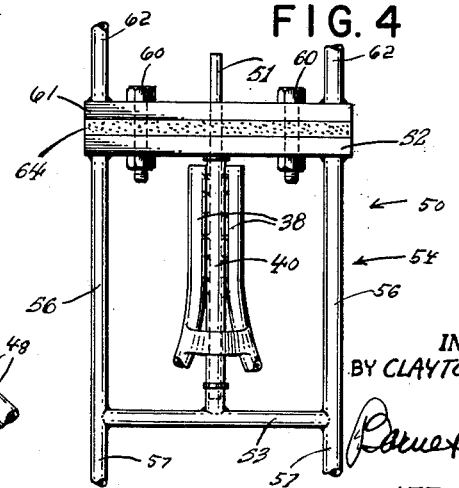
INVENTOR.
BY CLAYTON B. MERRY
ATTORNEYS July 9, 1963

C. B. MERRY 3,096,997

SPRING FRAME FOR SCOOTER-TYPE TRAIL VEHICLE

Filed March 3, 1961

INVENTOR.
CLAYTON B. MERRY
BY
ATTORNEYS

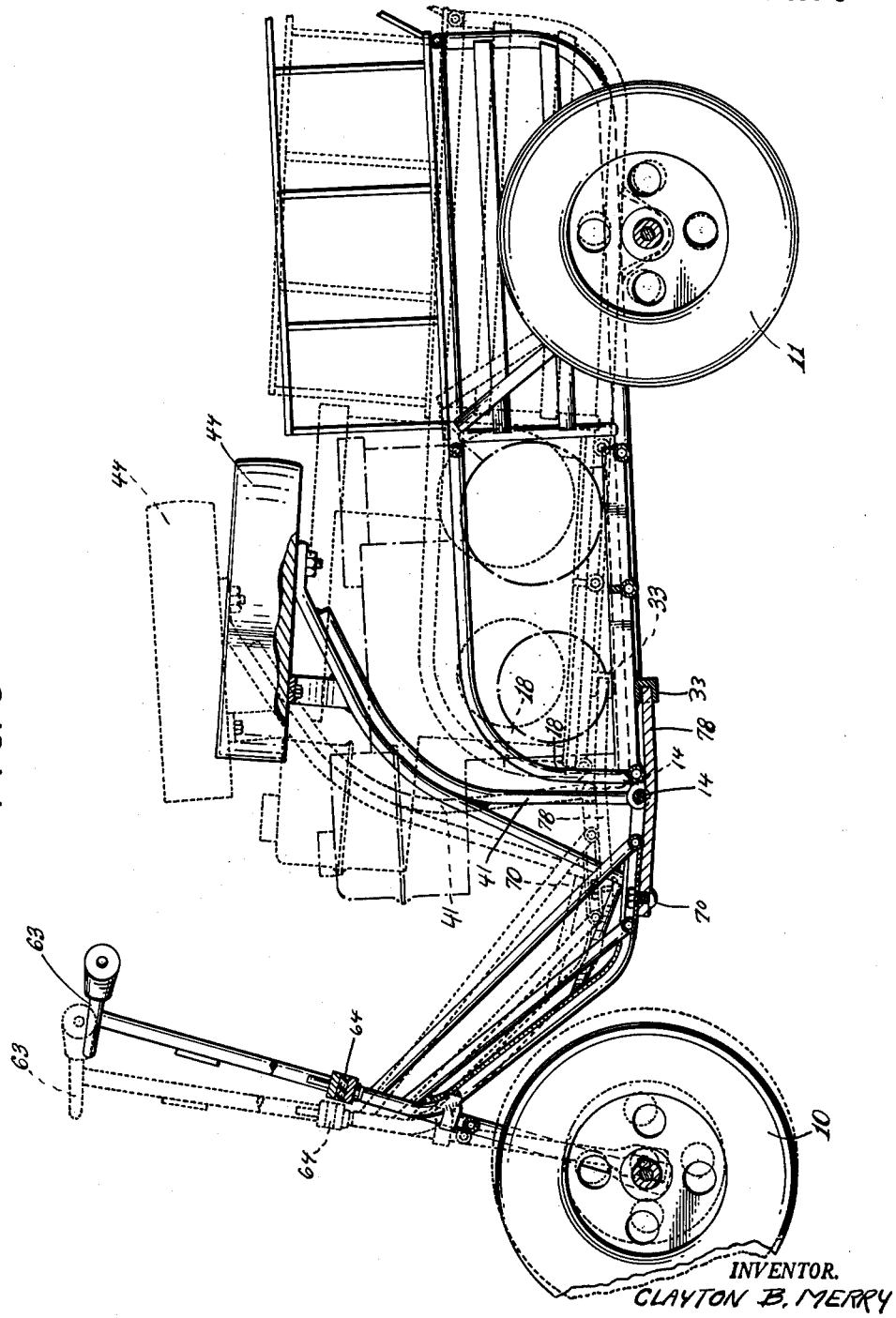

ates Patent Office 3,096,997
Patented July 9, 1963

3,096,997
SPRING FRAME FOR SCOOTER-TYPE
TRAIL VEHICLE
Clayton B. Merry, Leavenworth, Wash., assignor, by mesne assignments, to William E. Wilson, Sr., Kent, Wash.
Filed Mar. 3, 1961, Ser. No. 93,219
4 Claims. (Cl. 280—275)

This invention relates to a trail vehicle and more particularly to a scooter type motorized trail vehicle.

A general object of my invention is to provide a vehicle of this nature having an improved spring suspension system.

A further particular object is to provide an improved seat mounting which in conjunction with the spring suspension system gives the rider better steering control and a more even ride over rough terrain.

Another important object is to provide a shock insulator pad in the steering column which isolates the steering handle from shocks and vibrations transmitted by the front wheel.

Yet another important object is to provide a frame structure comprising front and rear frame sections articulating for swing motion about a transverse horizontal axis located intermediate the front and rear wheels, with a leaf spring so connected to each frame section as to yieldingly resist relative flexure as between the two.

A further particular object is to so construct the front and rear frame sections as to establish a limit of swing motion under stress of shock loading.

Yet another particular object is to so provide such a spring suspension as permits flat and bent leaf springs to be interchangeably employed in order to meet changing load conditions.

A yet additional object is to provide a suspension system of such rugged construction as will withstand the rigors of trail use and which lends itself to repair and replacement of parts with unusual ease and expedition.

With yet additional objects and advantages in view which, with the foregoing, will appear and be understood in the course of the following description and claims, the invention consists in the novel construction and in the adaptation and combination of parts hereinafter described and claimed.

In the accompanying drawings:

FIGURE 1 is a side elevational view showing a trail scooter constructed to embody preferred teachings of my invention.

FIG. 2 is a top plan view thereof.

FIG. 3 is a fragmentary side elevational view drawn to an enlarged scale detailing the portion of the steering fork circled at "3" in FIG. 1.

FIG. 4 is a front elevational view of the structure shown in FIG. 3.

FIG. 6 is a view similar to FIG. 5 showing the manner in which the vehicle's spring characteristics are modified by the instrumentality of employing selected leaf springs.

Figure 5:
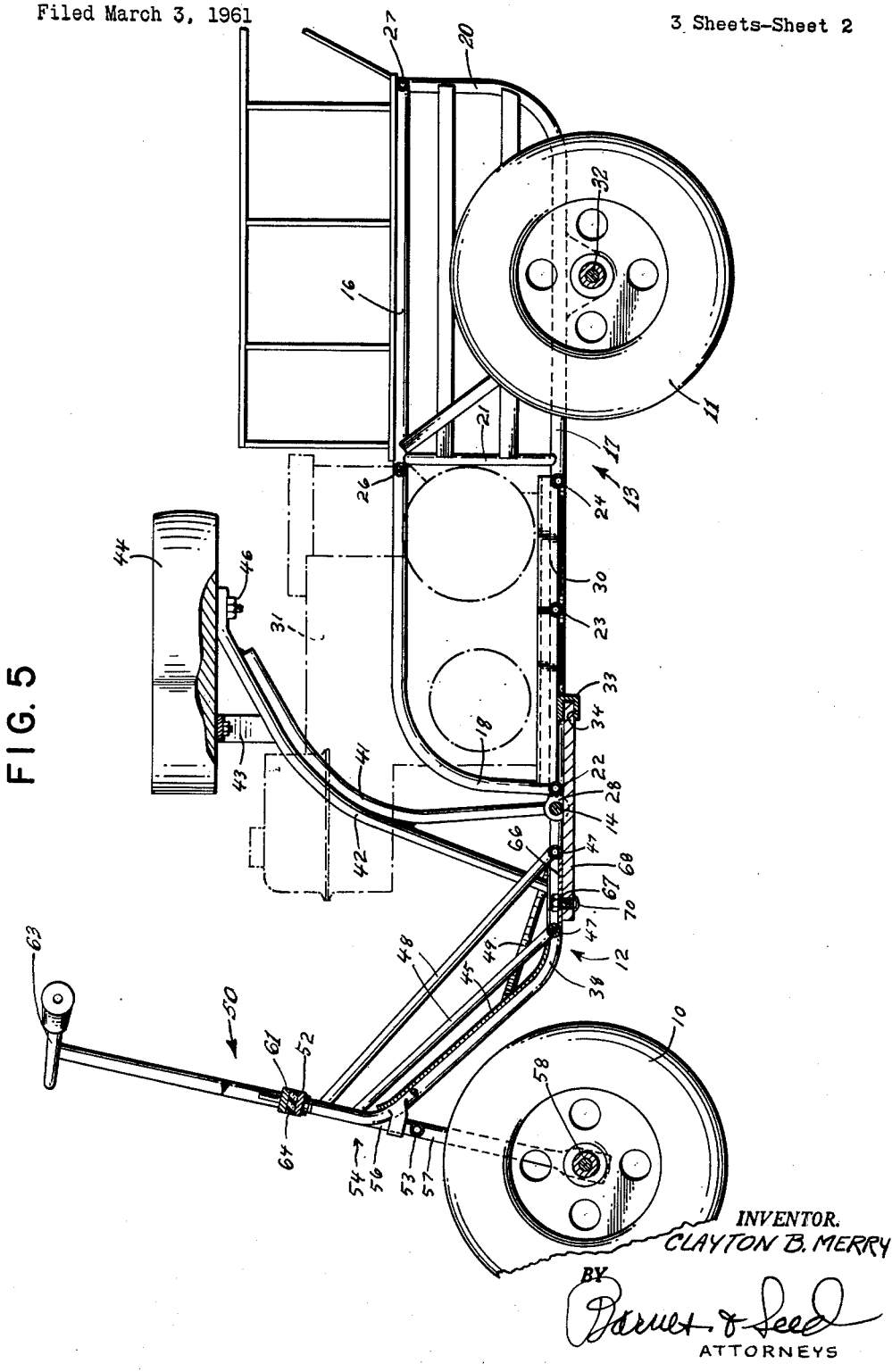
FIG. 5 is a fragmentary longitudinal vertical sectional view drawn to an enlarged scale on line 5—5 of FIG. 2.

Referring to said drawings, the vehicle rides on a front steerable ground wheel 10 and a rear traction ground wheel 11, and comprises a separate front and rear frame section 12, and 13, respectively, which articulate for up and down swing motion about a transverse horizontal axis. The pivot pin for such articulation is denoted by 14.

The construction of the frame section as here shown comprises, for each side of the vehicle, top and bottom stringers 16 and 17, respectively, joined one to another by suitable vertical struts. As here shown, there are three such struts. One of these, designated 18, lies at the front and comprises a downturned end of the upper stringer 16. A second strut, designated 20, lies at the rear and comprises an upturned end of the bottom stringer 17. The third strut 21 lies midway between said end struts. The two bottom stringers 17, one at each side of the vehicle, are connected transversely by cross members 22, 23 and 24; and the two upper stringers 16 are joined by cross members 26 and 27. The cross member 22 which lies at the extreme forward end of the lower stringers presents forwardly extending ears 28 adjacent each of its two end limits, through which ears the pivot pin 14 is received.

Supported by said lower cross members 22, 23 and 24 are longitudinal angle iron mountings 30 to support an internal combustion engine 31, the outline of which is shown in broken lines. The engine has a transmission lying to the rear thereof, and from the transmission an endless chain (not shown) functions as a final drive to a sprocket wheel (not shown) fixed to the axle 32 of the rear wheel 11.

For a purpose which will be hereinafter described, there is provided at the mid-width of the vehicle below the engine mountings and behind and slightly below the pivot pin 14, a box-forming cross member 33 presenting a forwardly facing horizontal pocket 34 closed top and bottom and at the ends.

The front frame engages the pivot pin 14 by means of two apertured lugs 37, each of which engages one end of the pivot pin outside of, and adjacent to, the two ears 28. Each lug lies at the juncture of two tubular frame members and is welded thereto. The first of said members, designated 38, extends horizontally and forwardly each from their respective lug, and at the front end each curves diagonally in an upward and inward direction to terminate in short vertical portions which are welded to opposite sides of a steering column 40. The second of said members, designated 41, rises vertically from the related lug, and at its approximate midlength curves toward the rear. Two auxiliary frame members 42 are welded at their lower ends one to each of the horizontal portions of the support members 38, rising vertically therefrom and each having its rear end portion overlying and welded to a related one of the rearwardly curving upper portions of said members 41. Extreme upper end portions of said frame members 42 project a moderate distance beyond said members 41 and serve in conjunction with a cross piece 43 as rests for a driver's seat 44, being secured thereto by bolts 46. Thus the seat 44 is mounted well above and slightly behind the pivot pin 14. Two stiffening cross braces 47 extend between the horizontal portions of the support members 38, and two diagonal reinforcing struts 48 extend one from the midlengths of each of the cross braces 47 to the steering column 40. A relatively thin metal sheet 45 is attached as a mud guard to the support members 38 and covers the entire area therebetween. Each one of two foot rests 49 is conveniently welded to the outside edge of each of the support members 38.

The steering column 40 provides support for the steering post, generally designated as 50, specifically by providing bearing support by means of a king pin 51. The king pin is invested in the steering column and is received above and below in journal boxes carried at the substantial center of parallel upper and lower cross members 52 and 53, respectively, of a vertical O-frame 54. The side branches 56 of the O-frame present downwardly extending fork arms 57. These fork arms receive the front wheel 10 therebetween and provide a rotary journal by means of a front axle 58.

Two bolts 60 extend through the upper cross piece 52 to join said cross piece to an overlying matching cross piece 61. Welded to each end of, and extending upwardly from the cross piece 61 as substantial extensions of the side branches 56 of the O-frame, are side supports 62, which attach at their upper ends to a steering handle 63. A shock-insulating pad 64 is sandwiched between the cross pieces 52 and 61.

Reverting to the rear end of said front frame section it will be seen that a longitudinally disposed channel member 66 is welded between the two cross braces 47 to occupy a position on the longitudinal median line of the vehicle, and it will be noted that the root ends of the diagonal struts 48 connect with said cross braces at the two ends of said channel member so as to rigidly localize the latter. A bolt hole 67 extends through the web of said channel member, which web lies flush with the underside of the cross braces 47. A stiff leaf spring 68 underlies said web and has its front end rigidly attached thereto by means of a bolt 70. The spring is disposed horizontally and extends rearwardly from the channel member, and has its rear end fitted into the forwardly facing horizontal pocket 34 of the afore-mentioned box member 33.

As the vehicle rides over rough terrain and as shocks are transmitted to either or both of the ground wheels 10 and 11, the frame sections 12 and 13 will partake of relative swing motion in a vertical plane, moving about the center of pivot shaft 14 as an axis, with the motion dampened by the yielding resistance afforded by the leaf spring 68. It should be here noted that each of the front vertical struts 18 of the rear frame section lies in the same longitudinal vertical plane as the related root end portion of the seat-support frame member 41. Each strut 18 and the aforementioned root end portion of the member 41 diverge upwardly from the pivot pin 14, so as to form two sides of an angle with the pivot pin located at the approximate apex. For a reason which will hereinafter be explained when the leaf spring occupies a normal non-stressed condition, the angle may vary between 5° and 10°, depending upon the precise shape and position of the spring. When the pivot pin 14 moves downwardly to reflect extreme load-stressing of the spring, the members 41 of the front frame section bottom against the struts 18 of the rear frame section to provide a limit stop.

For a person of average height and weight, a flat leaf spring 68 as shown in FIGS. 1 and 5 is desirably specified. However, another leaf spring 78 which has a permanent bend at its approximate midlength may be employed in place of the planar spring 68. As shown in the solid lines of FIG. 6, such modified spring 78 in an unflexed position is bent in the shape of a shallow V with the inner angle facing upward so that the pivot 14 is lowered, which in turn perforce lowers the seat 44. However, by inverting the spring, as shown in the dotted lines of FIG. 6, the pivot and seat are both raised. Thus by inserting a spring with a predetermined angle of bend and by selective use in either of its two inverted positions, the vehicle may be adjusted to accommodate a heavier or lighter, and taller or shorter rider.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A trail vehicle comprising a forward frame section having a steering post attached thereto for swivel motion about a generally vertical axis at the forward part of said frame section, a front ground wheel carried between fork arms at the lower end of said steering post, the upper end of said post having a steering handle for controlling turning movements of said steering post, a rider's seat mounted on the forward frame section below and behind said steering handle so that a rider seated thereon may conveniently grasp said steering handle, a rear frame section secured to said front frame section for relative swing motion about the center of a horizontal transverse pivot pin located intermediate the front wheel and a rear ground wheel carried by said rear frame section for rotation in substantially the same longitudinal vertical plane as said front wheel, a spring so connected to each of said frame sections as to prescribe a relative angular position of the sections when the spring is unflexed, said spring yieldingly resisting relative swinging of the frames so that, as said vehicle rides over rough terrain, resulting shocks to said wheels will be passed into the spring, said front and rear frame sections having complementing stop members lying in the same longitudinal vertical plane, said stop members being so disposed that as a relatively strong upward force is applied to either wheel to responsively swing the related frame section, the stop members of each section will be brought to bear against one another to a limit of swing, the steering post comprising two pieces separated by a shock-dampening pad the lower portion of said steering post being pivotally mounted on an axis rigid with respect to said frame section so that shocks transmitted to said frame section through said front wheel are dampened with respect to the upper steering post part by means of said pad, said spring being a longitudinal leaf spring positioned adjacent said pin and capable of being inverted so that the angle defined between two planes one of which contains the pivot axis and an axle for the rear wheel and the other of which contains said pivot axis and an axle for the front wheel may be increased or decreased at will.

2. A trail vehicle comprising a forward and a rear frame section supported respectively by at least one front ground wheel and one rear ground wheel, said frame sections being pivotally connected so that said sections are enabled to swing vertically with respect to one another about a transverse horizontal axis located intermediate the wheels and at a level near the lower portions of said frame sections, frame portions at the bottom part of said frame sections lying in substantially the same horizontal plane, a horizontal leaf spring reaching between said frame sections and positioned below and adjacent to the said frame portions which lie in said horizontal plane, forward and rear portions of said spring engaging respectively the forward and rear frame sections, one of said last named spring portions being rigidly secured to its related frame section, a vehicle portion intermediate the points at which the forward and rear portions of said spring engage the related frame sections, which last named vehicle portion bears against said spring as said spring flexes in one direction so that said spring resists flexing in said one direction more than in the other.

3. A trail vehicle comprising, a forward frame section having a steering post swivel mounted thereto along a generally vertical axis at the forward part of said frame section, a front wheel rotatably supported at the lower end of said steering post, the upper end of said post having a steering handle, a rider's seat mounted on the forward frame section below and behind said steering handle, a rear frame section swingably secured to said front frame section for motion about a horizontal transverse axis, a rear wheel rotatably mounted on said rear frame section and being in the same vertical longitudinal plane as said front wheel, a spring connected to both said frame sections so as to determine the relative angular position of the sections when the spring is unflexed, said spring resisting relative swing motion of the frames so that as said vehicle rides over rough terrain resulting shocks to said wheels will be absorbed in the spring as the frame sections swing one with respect to the other, the axis of swing motion lying approximately midway between said front and rear wheels, said spring being a leaf spring reaching between and engaging said frame sections at the lower portions thereof, the plane of said leaf spring being relatively close to said swing axis of said sections, said forward frame section presenting a steering column at its forward end, said steering post having upper and lower sections with the lower section being swivel-mounted to said steering column by a king pin, a crosspiece rigidly secured to the top of said lower section of the steering post, a pad overlying said crosspiece, said upper steering post section including said steering handle and being connected to said crosspiece and overlying said pad so that shocks transmitted to said king pin from said front wheel will be dampened by said pad to insulate said steering handle from said shocks.

4. A trail vehicle comprising, a forward and a rear frame section supported respectively by at least one front ground wheel and one rear ground wheel, said frame sections being pivotally connected so that said sections are enabled to swing vertically with respect to one another about a transverse horizontal axis located intermediate the wheels and at a level near the lower portions of said frame sections, frame portions at the bottom part of said frame sections lying in substantially the same horizontal plane, a horizontal leaf spring reaching between said frame sections and positioned below and adjacent to the said frame portions which lie in said horizontal plane, the forward portion of said spring engaging said forward frame portion at a location moderately forward of said pivot axis and the rear portion of said spring engaging said rear frame portion at a location moderately to the rear of said pivot axis, a vehicle portion intermediate the points of which the forward and rear portions of said spring engage the related frame sections, which last named vehicle portion bears downwardly against said spring as said spring flexes because of one frame section pivoting upwardly with respect to the other.

References Cited in the file of this patent

UNITED STATES PATENTS

| | | |
|---|---|---|
| 1,051,773 | Stevens | Jan. 28, 1913 |
| 1,306,995 | Bradshaw | June 17, 1919 |
| 1,686,427 | Wallgren | Oct. 2, 1928 |
| 1,745,963 | Trouche | Feb. 4, 1930 |
| 2,561,156 | Thorkildsen | July 17, 1951 |
| 2,792,236 | Jacquart | May 14, 1957 |
| 2,910,130 | Schlaphoff | Oct. 27, 1959 |

FOREIGN PATENTS

| | | |
|---|---|---|
| 47,846 | Sweden | Dec. 12, 1917 |
| 189,934 | Austria | July 7, 1955 |